US010666096B2

United States Patent
Seo et al.

(10) Patent No.: US 10,666,096 B2
(45) Date of Patent: May 26, 2020

(54) DIRECT COOLING DRIVING MOTOR FOR VEHICLE

(71) Applicants: Hyundai Motor Company, Seoul (KR); Kia Motors Corporation, Seoul (KR)

(72) Inventors: Young Jin Seo, Yongin-si (KR); Myung Kyu Jeong, Seoul (KR); Yeon Ho Kim, Suwon-si (KR); Jae Bum Park, Suwon-si (KR); Jae Min Yu, Incheon (KR); Hee Ra Lee, Anyang-si (KR); Ga Eun Lee, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 357 days.

(21) Appl. No.: 15/497,681

(22) Filed: Apr. 26, 2017

(65) Prior Publication Data
US 2018/0175679 A1 Jun. 21, 2018

(30) Foreign Application Priority Data
Dec. 15, 2016 (KR) .................. 10-2016-0171635

(51) Int. Cl.
*H02K 1/20* (2006.01)
*H02K 3/24* (2006.01)
(Continued)

(52) U.S. Cl.
CPC ............. *H02K 1/20* (2013.01); *B60K 1/00* (2013.01); *B60L 50/51* (2019.02); *H02K 1/148* (2013.01);
(Continued)

(58) Field of Classification Search
CPC ............ H02K 1/20; H02K 1/148; H02K 3/24; H02K 5/20; H02K 9/005; H02K 9/19;
(Continued)

(56) References Cited

U.S. PATENT DOCUMENTS 5,331,238 A * 7/1994 Johnsen ................. H02K 1/185
310/216.049
5,682,074 A * 10/1997 Di Pietro ........... B22D 19/0054
310/211
(Continued)

FOREIGN PATENT DOCUMENTS

EP 2330719 A1 6/2011
JP 2010-263715 A 11/2010
(Continued)

OTHER PUBLICATIONS

WO-2009153096-A2 (English Translation) (Year: 2009).*
JP-2011036024-A (English Translation) (Year: 2011).*

*Primary Examiner* — Jermele M Hollington
*Assistant Examiner* — Alexander Moraza
(74) *Attorney, Agent, or Firm* — Brinks Gilson & Lione

(57) ABSTRACT

A direct-cooling stator core assembly having cooling channels so as to directly cool a stator core and a wound coil, and a driving motor for a vehicle including the same, are provided. The direct-cooling stator core assembly includes a stator core having an outer surface and a plurality of core recesses formed in the outer surface in a longitudinal direction. The direct-cooling stator core assembly further includes a cooling fluid supply member configured to supply cooling fluid to the core recesses in the stator core. In the direct-cooling stator core assembly, when cooling fluid is flowing through the core recesses, the cooling fluid flowing through the core recesses directly cools the stator core.

10 Claims, 5 Drawing Sheets

(51) Int. Cl.
*H02K 5/20* (2006.01)
*H02K 9/19* (2006.01)
*H02K 1/14* (2006.01)
*B60L 50/51* (2019.01)
*B60K 1/00* (2006.01)

(52) U.S. Cl.
CPC ............... *H02K 3/24* (2013.01); *H02K 5/20* (2013.01); *B60K 2001/003* (2013.01); *H02K 9/19* (2013.01); *H02K 2203/12* (2013.01)

(58) Field of Classification Search
CPC .......... H02K 9/193; H02K 3/34; H02K 3/345; H02K 2203/12; B60K 1/00; B60K 2001/003; B60K 2001/006; B60L 11/1803; B60L 50/51
USPC ...... 310/52–64, 216.119, 214, 194, 216.014, 310/216.056; 180/229
See application file for complete search history.

(56) References Cited

U.S. PATENT DOCUMENTS

| | | | | |
|---|---|---|---|---|
| 6,533,558 | B1 * | 3/2003 | Matsumoto | F04C 18/3442 417/368 |
| 2002/0067086 | A1 * | 6/2002 | Kikuchi | H02K 1/148 310/54 |
| 2006/0066159 | A1 * | 3/2006 | Enomoto | H02K 1/148 310/54 |
| 2008/0100159 | A1 * | 5/2008 | Dawsey | H02K 1/20 310/54 |
| 2009/0184591 | A1 * | 7/2009 | Hoshino | H02K 3/24 310/54 |
| 2010/0176668 | A1 * | 7/2010 | Murakami | H02K 1/20 310/54 |
| 2010/0218918 | A1 | 9/2010 | Sonohara | |
| 2010/0296950 | A1 * | 11/2010 | Kataoka | F04B 39/0238 417/410.1 |
| 2012/0080982 | A1 * | 4/2012 | Bradfield | H02K 1/20 310/60 A |
| 2013/0115064 | A1 * | 5/2013 | Kimura | H02K 3/522 415/177 |
| 2016/0241093 | A1 * | 8/2016 | Patel | H02K 3/24 |

FOREIGN PATENT DOCUMENTS

| | | | | |
|---|---|---|---|---|
| JP | 2011036024 | A | * 2/2011 | |
| KR | 10-2016-0056351 | | 5/2016 | |
| WO | WO-2009153096 | A2 | * 12/2009 | ............... H02K 5/20 |

* cited by examiner

DIRECT COOLING DRIVING MOTOR FOR VEHICLE

CROSS-REFERENCE TO RELATED APPLICATION

This application claims priority to Korean Patent Application No. 10-2016-0171635, filed on Dec. 15, 2016, the entire contents of which are incorporated herein by reference.

FIELD

The present disclosure relates to a driving motor for a vehicle. More particularly, the present disclosure relates to a driving motor having a cooling structure that is capable of improving the cooling performance of the driving motor.

BACKGROUND

An eco-friendly vehicle is equipped with an electric motor for driving the vehicle using electric power from a high-voltage battery. The main components of the driving motor for producing output are a permanent magnet, a core, and a coil. Electric resistance and magnetic resistance are generated in these components due to electric current or magnetic force applied thereto, which causes heat generation in the motor. Therefore, in a high-temperature condition above a predetermined temperature, irreversible deterioration in performance of the components may occur, which may cause damage to the components and degradation of the performance of the motor. Accordingly, in order to maintain the performance of the motor, cooling for maintaining the temperature of the motor at a certain level is essential.

For this reason, protection logic for protecting the internal components is applied, such that when the temperature of the motor rises above a predetermined level the output of the motor is limited or stopped. If the motor is cooled and the temperature thereof is maintained at a low level, the motor driving time is increased, which results in improved fuel efficiency and driving efficiency of the eco-friendly vehicle.

As methods of cooling a motor, an air-cooling method and a water-cooling method are employed. In the air-cooling method, a heat sink is formed at a motor housing in order to achieve cooling using external cooling air. In the water-cooling method, cooling channels are formed in the interior of a motor housing, or outside a stator, in order to achieve cooling using cooling water.

FIG. 1 illustrates an exemplary air-cooling method. As shown in the drawing, a heat sink 4 is formed at a motor housing 1, which is disposed at the exterior of a rotor 3 and a stator 2. Because it has an indirect-cooling structure such that cooling is performed with respect to the motor housing, rather than to a heat source, the cooling performance is degraded. Therefore, the air-cooling method shown in FIG. 1 has a limitation in cooling performance when the output of a motor is high and a heating value is thus relatively high. Further, because traveling wind of a vehicle is typically used as external cooling air, the air-cooling method has a problem in that it is impossible to control the flow rate of the cooling air depending on the temperature of the motor.

Meanwhile, the water-cooling method is an indirect-cooling method using a heat conduction phenomenon between cooling water, a housing, and a heat source. A driving motor having a water cooling structure is disclosed in Korean Patent Publication No. 2016-0056351 (May 20, 2016). However, the indirect-cooling driving motor, which has a water-cooling structure, has a disadvantage in that cooling efficiency is degraded due to the contact state (i.e. contact thermal resistance) between the components.

For this reason, a direct motor cooling method using oil spray has been recently employed. However, this cooling method has some structural constraints, for example, pertaining to the design of an oil spray hole and oil supply pipe lines, and has a limitation in that only an outer surface of an end coil portion is mainly cooled.

The above information disclosed in this Background section is only for enhancement of understanding of the background of the disclosure and therefore it may contain information that does not form the related art already known to a person of ordinary skill in the art.

SUMMARY

The present disclosure has been made in an effort to solve the above-described problems associated with the related art, and the present disclosure provides a direct-cooling driving motor having a cooling structure that is capable of directly cooling main heat sources of the motor, i.e. a stator core and a coil, using a cooling medium, thereby improving the cooling performance of the driving motor.

In a first aspect, the present disclosure provides a direct-cooling stator core assembly. The direct-cooling stator core assembly includes a stator core having an outer surface and a plurality of core recesses formed in the outer surface in a longitudinal direction. The direct-cooling stator core assembly further includes a cooling fluid supply member configured to supply cooling fluid to the core recesses in the stator core. In the direct-cooling stator core assembly, when cooling fluid is flowing through the core recesses, the cooling fluid flowing through the core recesses directly cools the stator core.

In a second aspect, the present disclosure provides a direct-cooling driving motor for a vehicle. The direct-cooling driving motor for a vehicle includes a motor housing. The direct-cooling driving motor for a vehicle further includes a stator core securely mounted in the motor housing, the stator core having an outer surface and a plurality of core recesses formed in the outer surface in a longitudinal direction. The direct-cooling driving motor for a vehicle further includes a cooling fluid supply member configured to supply cooling fluid to the core recesses in the stator core. The direct-cooling driving motor for a vehicle further includes a rotor disposed in the stator core and configured to rotate together with a rotating shaft. In the direct-cooling driving motor for a vehicle, when cooling fluid is flowing through the core recesses, the cooling fluid flowing through the core recesses directly cools the stator core.

In an exemplary form, the stator core may be provided with a plurality of teeth, each of the core recesses being formed at a respective position corresponding to an outer surface of a respective one of the teeth. The direct-cooling driving motor may further include a bobbin guide mounted so as to surround at least a portion of a respective one of the teeth, and a coil wound around the bobbin guide.

In an exemplary form, the bobbin guide may have a guide recess portion to communicate with each of the core recesses.

In an exemplary form, the guide recess portion may include, for each of the core recesses, a respective pair of guide recesses located at positions corresponding to two opposite ends of the core recess in order to guide cooling fluid discharged from the two opposite ends of the core recess.

In an exemplary form, the guide recess portion may include, for each of the core recesses, a respective pair of guide recesses extending in a radial direction of the stator core from positions corresponding to two opposite ends of the core recess.

In an exemplary form, each of the core recesses and the guide recess portion may together form a respective U-shaped cooling channel. Further, for each of the U-shaped cooling channels, when cooling fluid is flowing through a portion of the cooling channel defined by the core recess of the cooling channel, the cooling fluid flowing through the portion of the cooling channel defined by the core recess may directly cool the stator core. Further, for each of the U-shaped cooling channels, when cooling fluid is flowing through a remaining portion of the cooling channel defined by the guide recess portion, the cooling fluid flowing through the remaining portion of the cooling channel defined by the guide recess portion may directly cool the coil.

In an exemplary form, the stator core may have a structure assembled from a plurality of core units, each of the plurality of core units including a respective single tooth and a respective single core recess.

In an exemplary form, the cooling fluid supply member may be an insert ring press-fitted between the motor housing and the stator core. Further, the insert ring may have an outer surface and a cooling channel formed in the outer surface. Further, cooling fluid may be able to flow between the outer surface of the insert ring and an inner surface of the motor housing through the cooling channel.

In an exemplary form, the insert ring may have one or more holes, and the holes may communicate with the core recesses in the stator core.

Other aspects and exemplary forms of the disclosure are discussed below.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed below.

DRAWINGS

The above and other features of the present disclosure will now be described in detail with reference to certain exemplary forms illustrated in the accompanying drawings, which are provided by way of illustration only and thus are not limitative of the present disclosure, and wherein.

It should be understood that the appended drawings are not necessarily to scale, and present a somewhat simplified representation of various preferred features illustrative of the basic principles of the disclosure. The specific design features of the present disclosure as described herein, including, for example, specific dimensions, orientations, locations, and shapes, will be determined in part by the particular intended application and use environment.

In the figures, same reference numbers refer to the same or equivalent parts of the present disclosure throughout the several figures of the drawings.

DETAILED DESCRIPTION

Hereinafter, reference will be made in detail to various forms of the present disclosure, examples of which are illustrated in the accompanying drawings and described below. While the disclosure will be described in conjunction with exemplary forms, it will be understood that the present description is not intended to limit the disclosure to those exemplary forms. On the contrary, the disclosure is intended to cover not only the exemplary forms, but also various alternatives, modifications, equivalents and other forms, which may be included within the spirit and scope of the disclosure as defined by the appended claims.

The present disclosure relates to a direct-cooling stator core assembly and a driving motor for a vehicle including such a stator core assembly. More particularly, the present disclosure relates to a stator core assembly having cooling channels so as to directly cool a stator core and a wound coil, and a driving motor for a vehicle including the same.

Hereinafter, a direct-cooling stator core assembly and a driving motor for a vehicle according to an exemplary form of the present disclosure will be described in detail with reference to the drawings.

Figure 1:
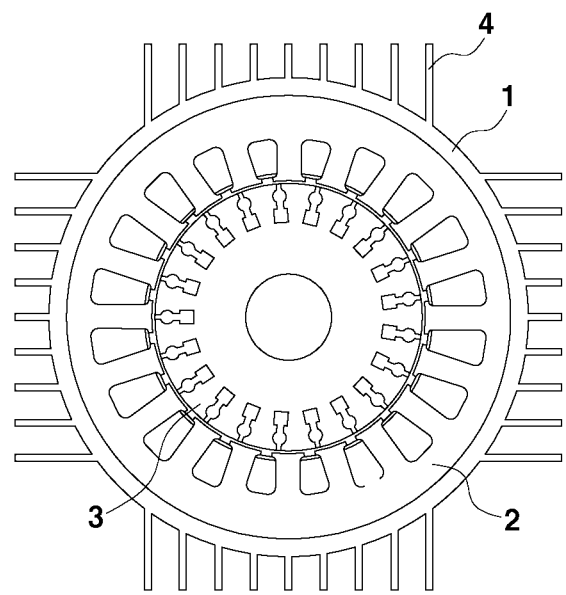
FIG. 1 is a view illustrating a driving motor having a cooling structure in which a heat sink is formed at a motor housing.
Figure 2:
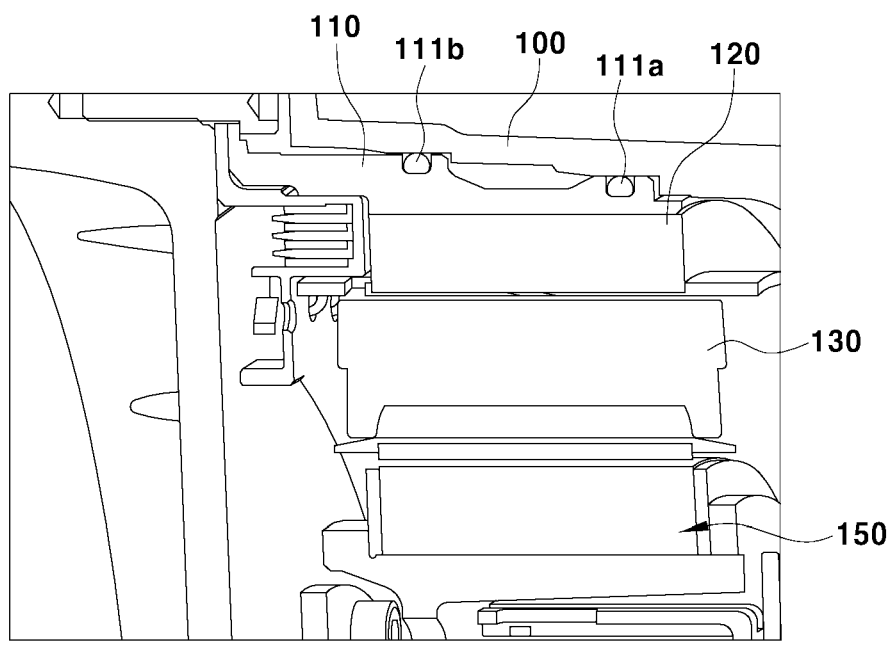
FIG. 2 is a sectional view of a driving motor for a vehicle.

As shown in FIG. 2, a driving motor for a vehicle according to an exemplary form of the present disclosure comprises a stator unit, which includes a stator core 120 and a coil 130 wound around the stator core 120, and a rotor unit, which includes a rotor 150 mounted to a rotating shaft. According to an exemplary form of the present disclosure, a cooling fluid supply member is inserted between the exterior of the stator core and a motor housing 100.

The cooling fluid supply member is disposed between the motor housing 100 and the stator core 120, and a cooling channel is formed between the cooling fluid supply member and the motor housing 100 so as to primarily cool the stator core 120 in an indirect-cooling manner. Here, "indirect cooling" means that the cooling fluid does not directly contact the object to be cooled, i.e. the stator core 120, but achieves cooling in a heat conduction manner using a separate cooling medium. This exemplary form is constructed such that a first cooling channel is formed between the motor housing 100 and the cooling fluid supply member, and such that the cooling fluid, which flows through the first cooling channel, indirectly cools the stator core 120.

Figure 3:
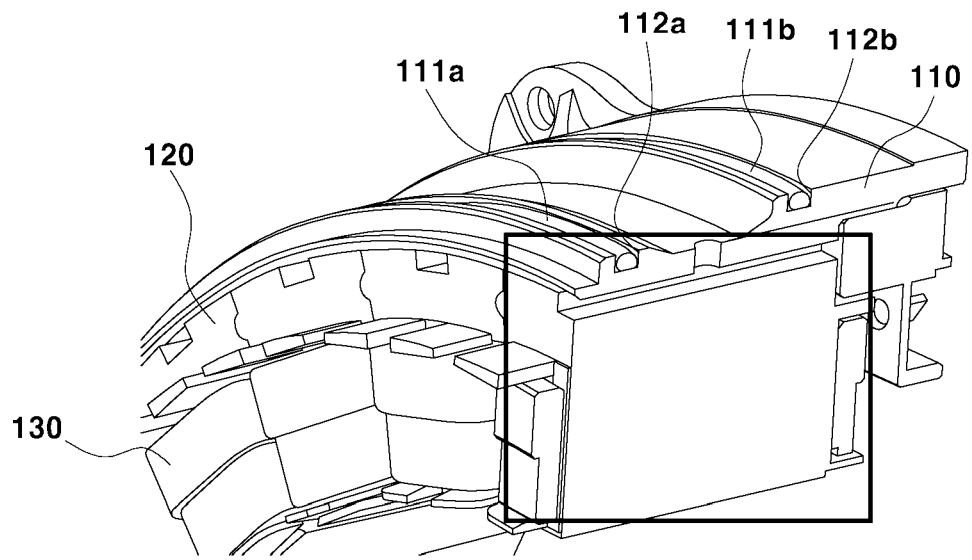
FIG. 3 is a cut view of a portion of the driving motor for a vehicle.
Figure 4:
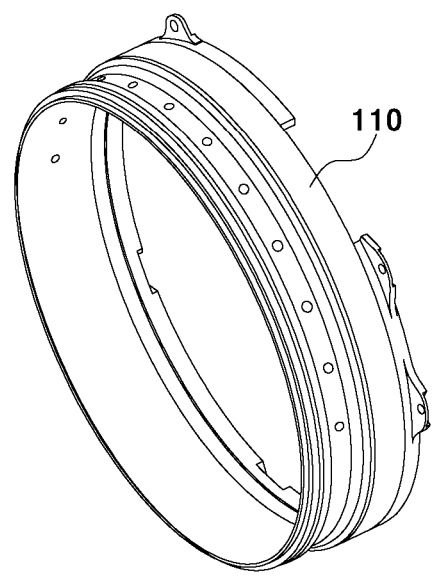
FIG. 4 is a view illustrating an exemplary insert ring included in the driving motor for a vehicle.

A specific example of the cooling fluid supply member is depicted in FIG. 4. FIG. 4 illustrates, as an example of the cooling fluid supply member, an insert ring 110, which is press-fitted between the motor housing 100 and the stator core 120. FIG. 3 illustrates a section of the structure in which the insert ring 110 is in a tight fit with the exterior of the stator core 120.

As shown in FIGS. 3 and 4, the insert ring 110, which is illustrated as an example of the cooling fluid supply member, has a ring shape, which is fitted on the exterior of the stator core 120. Further, as shown in FIGS. 3 and 4, a ring-shaped groove is formed around the outer peripheral surface of the insert ring 110 so as to define the first cooling channel, through which the cooling fluid flows and indirectly cools the stator core 120. In order to prevent the cooling water from leaking, a pair of sealing members 111*a* and 111*b*, and a pair of sealing grooves 112*a* and 112*b* for accommodating the sealing members, are provided around the first cooling channel.

An exemplary form of the present disclosure is constructed such that the cooling fluid flowing through the first cooling channel, which is formed between the motor housing 100 and the insert ring 110, is directed toward the stator core 120 so as to directly cool the stator core 120.

To this end, in an exemplary form of the present disclosure, a plurality of core recesses 121, through which the cooling fluid flows, is formed in the stator core 120. Further, a plurality of holes 113, through which the cooling fluid is supplied to the core recesses 121, is formed in the cooling fluid supply member, i.e. the insert ring 110.

The position at which the core recesses 121 are formed is not limited, so long as the core recesses 121 communicate with the first cooling channel, which is formed in the insert ring 110, so as to cool the stator core 120. Preferably, in order to realize uniform cooling with respect to the heat-generating portions of the stator core 120, the core recesses are formed so as to extend in the longitudinal direction of the stator core 120 while being equidistantly spaced apart from each other.

The core recesses 121 having this configuration are depicted in FIG. 3. According to an exemplary form of the present disclosure, the core recesses 121, as shown in FIG. 3, may be embodied as long grooves that are formed in the longitudinal direction of the stator core 120.

Figure 5:
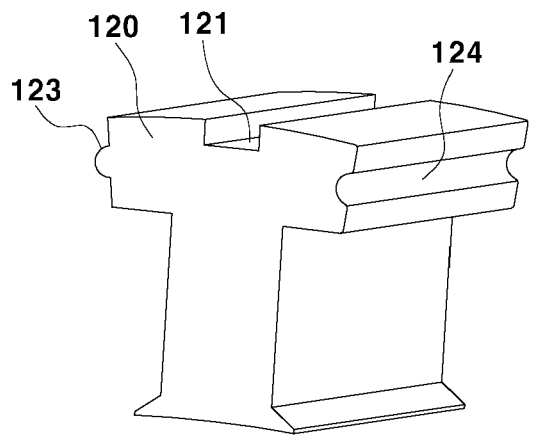
FIG. 5 is a view illustrating a division structure of a stator core included in the driving motor for a vehicle.

It is preferable for the core recesses 121 to be equidistantly spaced apart from each other. More preferably, the core recesses 121 are formed at positions corresponding to respective teeth of the stator core 120, around which the coil 130 is wound. Specifically, as shown in FIG. 5, each of the core recesses 121 in this exemplary form may be formed at a position that is aligned with the middle of a corresponding one of the teeth of the stator core 120. Therefore, the core recesses 121, which are formed in the exterior of the stator core 120 in alignment with the middle of the respective teeth, define second cooling channels C1, through which the cooling fluid flows in the longitudinal direction of the stator core 120, between the stator core 120 and the insert ring 110.

When the core recesses 121 are formed in the longitudinal direction of the stator core 120 as described above, the first cooling channel, which is formed in the circumferential direction of the stator core 120, is perpendicular to the second cooling channels.

Accordingly, the cooling fluid that flows through the second cooling channels C1 directly cools the portion of the stator core 120 in which the core recesses 121 are formed, and the cooling fluid that flows through the first cooling channel indirectly cools the remaining portion of the stator core 120.

As shown in FIGS. 3 and 4, a plurality of holes 113 is formed in the cooling fluid supply member, i.e. the insert ring 110, so as to communicate with the core recesses 121 in the stator core 120. Therefore, the cooling fluid flowing through the first cooling channel moves to the respective second cooling channels C1, i.e. the core recesses 121, through the plurality of holes 113.

The stator core 120 may have a monolithic structure in which a plurality of core recesses 121 is formed in a single stator core 120. Alternatively, the stator core 120 may have a structure assembled from a plurality of core units, each including a respective single tooth and a respective single core recess 121. FIG. 5 illustrates a single core unit, and FIG. 3 shows a plurality of core units assembled together to form the stator core 120. In the case of the stator core having this divided structure, each core unit may be provided with a respective protruding portion 123 and a respective coupling recess 124 so as to be assembled together with other core units.

According to another exemplary form of the present disclosure, the driving motor may further comprise a bobbin guide 140, which is configured to surround at least a portion of each of the teeth of the stator core 120. In this exemplary form, the coil 130 is not directly wound around the stator core 120, but is wound around the bobbin guide 140, which surrounds each of the teeth.

The bobbin guide 140 does not only function as a bobbin for winding the coil 130 thereon, but also functions to define a cooling channel for directly cooling the coil 130.

Specifically, according to this exemplary form, a guide recess portion 143 is formed in the outer surface of the bobbin guide 140 so as to define a space between the bobbin guide 140 and the coil 130 wound around the bobbin guide 140. The space defined by the guide recess portion 143 between the coil 130 and the bobbin guide 140 functions as third cooling channels C2 and C3 for directly cooling the coil 130.

Figure 6:
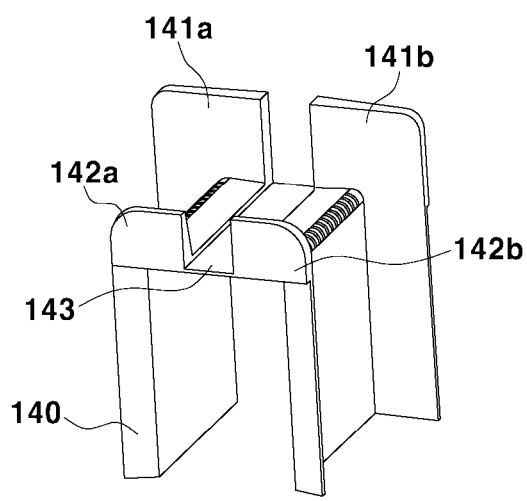
FIG. 6 is a view illustrating an exemplary bobbin guide included in the driving motor for a vehicle.

FIG. 6 illustrates the bobbin guide 140. The bobbin guide 140 includes upper and lower wing portions 141*a*, 141*b*, 142*a* and 142*b*, which protrude outwards for coil winding. The cooling fluid, which is discharged through two opposite ends of each of the core recesses 121, moves to the guide recess portion 143 through an opening formed between the wing portions 141*a* and 141*b* and an opening formed between the wing portions 142*a* and 142*b*. In other words, as shown in FIG. 6, the upper wing portions 141*a* and 141*b* are configured as a pair of wings, between which an opening is formed. This configuration is identically applied to the lower wing portions 142*a* and 142*b*.

The bobbin guide illustrated in FIG. 6 has a single guide recess formed in one side portion thereof, which is for convenience in coupling the bobbin guide to the stator core. However, it will be apparent to those skilled in the art that the bobbin guide further includes an additional element having another guide recess formed in the opposite side portion of the bobbin guide.

Figure 8:
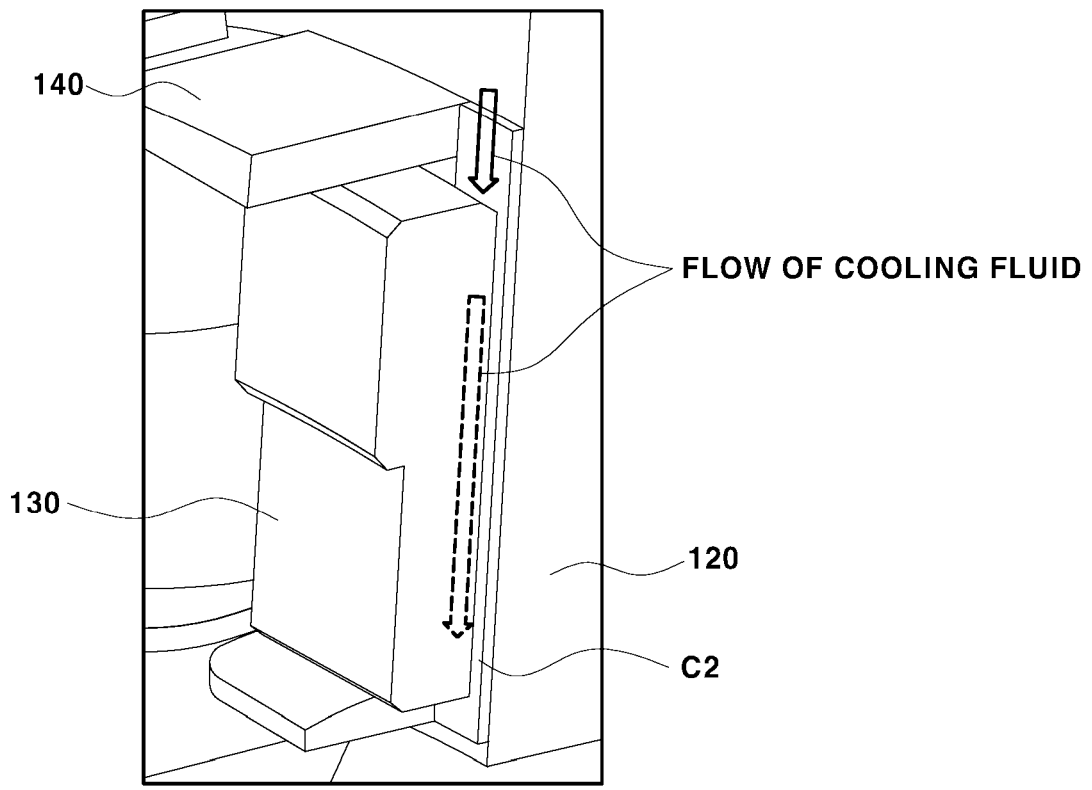
FIG. 8 is a view illustrating a cooling channel formed between the coil and the bobbin guide in FIG. 7.
Figure 9:
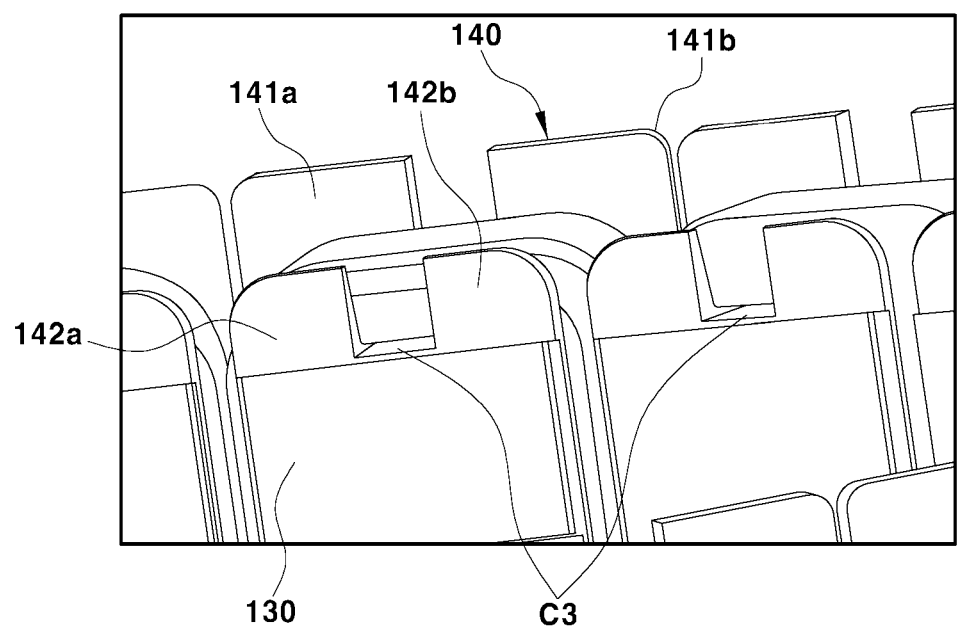
FIG. 9 is a view illustrating the appearance of the cooling channel formed between the coil and the bobbin guide in FIG. 7 when observed from the rotor.

The third cooling channels C2 and C3 are depicted in detail in FIG. 8. A stepped portion is formed on the outer surface of the bobbin guide 140 due to the guide recess, which defines the space through which the cooling fluid flows, i.e. the third cooling channels C2 and C3. FIG. 9 is a view illustrating the third cooling channel C3 observed from the rotor 150, from which it can be seen that the third cooling channel is formed between the coil and the bobbin guide.

The guide recess portion 143 is formed to communicate with the core recess 121 so that the cooling fluid that has passed through the second cooling channel C1 defined by the core recess 121 is supplied to the guide recess portion 143.

Figure 7:
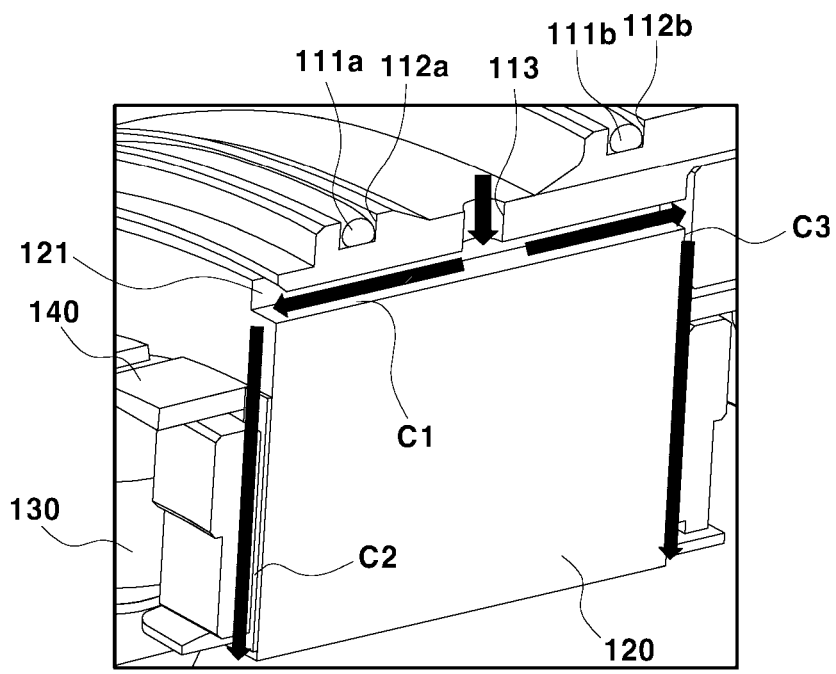
FIG. 7 is a partially enlarged view of FIG. 3.

Since the bobbin guide 140 has a structure that surrounds each of the teeth of the stator core 120, the bobbin guide 140 may function to guide the cooling fluid that is discharged from two opposite ends of the core recess 121. To this end, the bobbin guide 140 may be configured to have guide recesses formed at positions corresponding to two opposite ends of the core recess 121. For example, as shown in FIG. 7, the guide recesses in the bobbin guide 140 may be formed in the front portion and the rear portion of the stator core 120 so as to communicate respectively with two opposite ends of the second cooling channel C1 that is defined by the core recess 121. In detail, this exemplary form is constructed such that a pair of guide recesses is formed so as to communicate with the respective ends of the core recess 121, and such that the core recess 121 and the guide recess portion 143 form a U-shaped cooling channel.

According to this exemplary form, the guide recess portion 143 is configured to have a pair of guide recesses that extend in the radial direction of the stator core 120 from the positions corresponding to two opposite ends of the core recess 121. Therefore, the cooling fluid that flows through the second cooling channel C1 defined by the core recess 121 directly cools the stator core 120. Further, the cooling fluid that flows through the third cooling channels C2 and C3 that are defined by the guide recesses of guide recess portion 143 directly cools the interior of the coil 130.

Alternatively, an exemplary form of the present disclosure may be constructed such that at least a portion of the cooling fluid, which has passed through the core recess, directly moves toward the coil without passing through the guide recesses, thereby directly cooling the coil.

The guide recess portion formed in the bobbin guide 140 is not limited to a single recessed channel, but may have multiple branched channels in which the guide recess portion is branched into several recessed lines in the bobbin guide 140.

Although not illustrated in the drawings, an exemplary form of the present disclosure may further comprise a unit for collecting the cooling fluid that has passed through the third cooling channel and resupplying the collected cooling fluid to the first cooling channel. The unit may include, for example, a reservoir and a pump.

The above-described direct-cooling stator core assembly, and the driving motor for a vehicle including the same, are characterized in that heat-generating elements, i.e. the stator core and the coil, are directly cooled by the cooling fluid supplied to the motor, thereby improving heat transfer efficiency and making it possible to immediately control the temperature of the motor by controlling the flow rate of the cooling fluid.

As is apparent from the above description, a direct-cooling driving motor for a vehicle according to exemplary forms of the present disclosure may have the following effects.

First, the cooling performance of the driving motor is improved, thereby preventing major key components of the motor, i.e. a permanent magnet, a stator core, and a coil, from being damaged by excessive heat generation.

Second, the durability of the motor is improved by adequately adjusting the operating conditions depending on the temperature of the driving motor.

Third, since the eco-friendly vehicle can travel a long distance in an EV driving mode, the utilization of electrical energy is increased, and consequently fuel efficiency of the eco-friendly vehicle is improved.

Finally, since the time and frequency of use of the motor are increased, deterioration in marketability of the vehicle, which is caused by frequent engine startup, is reduced.

The disclosure has been described in detail with reference to exemplary forms thereof. However, it will be appreciated by those skilled in the art that changes may be made in these forms without departing from the principles and spirit of the disclosure, the scope of which is defined in the appended claims and their equivalents.

What is claimed is:

1. A direct-cooling driving motor for a vehicle, the direct-cooling driving motor comprising:
a motor housing;
a stator core securely mounted in the motor housing, the stator core having an outer surface formed with a plurality of core recesses extending along a width direction of the stator core;
a cooling fluid supply member fitted on the outer surface of the stator core and configured to supply cooling fluid to the core recesses in the stator core;
a rotor disposed in the stator core and configured to rotate together with a rotating shaft,
wherein when cooling fluid is flowing through the core recesses from the cooling fluid supply member, the cooling fluid flowing through the core recesses directly cools the stator core, and the stator core is provided with a plurality of teeth, each of the core recesses being formed at a respective position corresponding to an outer surface of a respective one of the teeth;
a bobbin guide mounted so as to surround at least a portion of each of the teeth; and
a coil wound around the bobbin guide,
wherein the bobbin guide has a guide recess portion formed so as to communicate with two opposite ends of the core recesses,
wherein the guide recess portion includes, for each of the core recesses, a respective pair of guide recesses located at positions corresponding to the two opposite ends of the core recesses in order to guide cooling fluid discharged from the two opposite ends of the core recesses,
wherein each of the core recesses is formed in a middle portion of the outer surface of the respective one of the teeth of the stator core, and
wherein:
each of the core recesses and the guide recess portion together form a respective U-shaped cooling channel, and
for each of the U-shaped cooling channels:
when cooling fluid is flowing through a portion of the cooling channel defined by the core recess of the cooling channel, the cooling fluid flowing through the portion of the cooling channel defined by the core recess directly cools the stator core, and
when cooling fluid is flowing through a remaining portion of the cooling channel defined by the guide recess portion, the cooling fluid flowing through the remaining portion of the cooling channel defined by the guide recess portion directly cools the coil.

2. The direct-cooling driving motor of claim 1, wherein the guide recess portion includes, for each of the core recesses, a respective pair of guide recesses extending in a radial direction of the stator core from positions corresponding to two opposite ends of the core recesses.

3. The direct-cooling driving motor of claim 1, wherein the stator core has a structure assembled from a plurality of core units, each of the plurality of core units including a respective single tooth and a respective single core recess.

4. The direct-cooling driving motor of claim 1, wherein:
the cooling fluid supply member is an insert ring press-fitted between the motor housing and the stator core,
the insert ring has an outer surface and a cooling channel formed in the outer surface, and
cooling fluid can flow between the outer surface of the insert ring and an inner surface of the motor housing through the cooling channel.

5. The direct-cooling driving motor of claim 4, wherein the insert ring has one or more holes, and the holes communicate with the core recesses in the stator core.

6. A direct-cooling stator core assembly comprising:
a stator core having an outer surface formed with a plurality of core recesses extending in a longitudinal direction; and
a cooling fluid supply member fitted on the outer surface of the stator core and configured to supply cooling fluid to the core recesses in the stator core,
wherein when cooling fluid is flowing through the core recesses from the cooling fluid supply member, the cooling fluid flowing through the core recesses directly cools the stator core, and the stator core is provided with a plurality of teeth, each of the core recesses being formed at a respective position corresponding to an outer surface of a respective one of the teeth;
a bobbin guide mounted so as to surround at least a portion of each of the teeth; and
a coil wound around the bobbin guide,
wherein the bobbin guide has a guide recess portion formed so as to communicate with two opposite ends of the core recesses,
wherein the guide recess portion includes, for each of the core recesses, a respective pair of guide recesses located at positions corresponding to the two opposite ends of the core recesses in order to guide cooling fluid discharged from the two opposite ends of the core recesses,
wherein each of the core recesses is formed in a middle portion of the outer surface of the respective one of the teeth of the stator core, and
wherein:
each of the core recesses and the guide recess portion together form a respective U-shaped cooling channel, and
for each of the U-shaped cooling channels:
when cooling fluid is flowing through a portion of the cooling channel defined by the core recess of the cooling channel, the cooling fluid flowing through the portion of the cooling channel defined by the core recess directly cools the stator core, and
when cooling fluid is flowing through a remaining portion of the cooling channel defined by the guide recess portion, the cooling fluid flowing through the remaining portion of the cooling channel defined by the guide recess portion directly cools the coil.

7. The direct-cooling stator core assembly of claim 6, wherein the guide recess includes, for each of the core recesses, a respective pair of guide recesses extending in a radial direction of the stator core from positions corresponding to two opposite ends of each of the core recesses.

8. The direct-cooling stator core assembly of claim 6, wherein the stator core has a structure assembled from a plurality of core units, each of the plurality of core units including a respective single tooth and a respective single core recess.

9. The direct-cooling stator core assembly of claim 6, wherein:
the cooling fluid supply member is an insert ring fitted on the outer surface of the stator core, and
the insert ring has an outer surface and a cooling channel formed in the outer surface.

10. The direct-cooling stator core assembly of claim 9, wherein the insert ring has one or more holes, and the holes communicate with the core recesses in the stator core.

* * * * *